United States Patent
Ikeda et al.

(10) Patent No.: US 7,820,123 B2
(45) Date of Patent: Oct. 26, 2010

(54) DEVICE FOR THE PURIFICATION OF EXHAUST GAS

(75) Inventors: Takuya Ikeda, Yokohama (JP); Maki Kamikubo, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 279 days.

(21) Appl. No.: 12/173,459

(22) Filed: Jul. 15, 2008

(65) Prior Publication Data

US 2008/0282683 A1   Nov. 20, 2008

Related U.S. Application Data

(62) Division of application No. 08/352,079, filed on Dec. 1, 1994, now Pat. No. 7,442,346.

(30) Foreign Application Priority Data

Dec. 20, 1993   (JP) .................................. 5-319931

(51) Int. Cl.
*B01D 53/94* (2006.01)
*F01N 3/10* (2006.01)

(52) U.S. Cl. ............. 423/213.2; 423/213.5; 423/213.7; 423/245.3; 423/247; 423/239.1; 423/239.2; 60/299; 60/300

(58) Field of Classification Search ............. 423/213.2, 423/213.5, 213.7, 245.3, 247, 239.1, 239.2; 60/299, 300

See application file for complete search history.

(56) References Cited

U.S. PATENT DOCUMENTS

| 4,985,210 | A | 1/1991 | Minami |
| 5,112,790 | A | 5/1992 | Watanabe et al. |
| 5,125,231 | A | 6/1992 | Patil et al. |
| 5,142,864 | A | 9/1992 | Dunne |
| 5,155,994 | A | 10/1992 | Muraki et al. |
| 5,315,824 | A | 5/1994 | Takeshima |
| 5,447,694 | A | 9/1995 | Swaroop et al. |
| 7,442,346 | B2 * | 10/2008 | Ikeda et al. .......... 422/171 |

FOREIGN PATENT DOCUMENTS

| EP | 0 485 179 A2 | 5/1992 |
| JP | 2-56247 | 2/1990 |
| JP | 2-135126 | 5/1990 |
| JP | 3-141816 | 6/1991 |
| JP | 5-31359 A | 2/1993 |

(Continued)

OTHER PUBLICATIONS

Heimrick, M.J., et al., "Cold-Start Hydrocarbon Collection for Advanced Exhaust Emission Control", SAE 920847, 1992.

(Continued)

*Primary Examiner*—Timothy C Vanoy
(74) *Attorney, Agent, or Firm*—Foley & Lardner LLP (57) ABSTRACT

As a device for the purification of exhaust gas, a three-way catalyst A purifying hydrocarbon, carbon monoxide and nitrogen oxide in the vicinity of theoretical air-fuel ratio is disposed at an upstream side of the exhaust gas and an adsorption catalyst B provided with zeolite effective for the adsorption of hydrocarbon is disposed at a downstream side of the exhaust gas.

11 Claims, 1 Drawing Sheet

FOREIGN PATENT DOCUMENTS

| JP | 5-59942 A | 3/1993 |
|----|-----------|--------|
| JP | 7-102957 A | 4/1995 |
| JP | 7-124467 | 5/1995 |
| JP | 7-124468 | 5/1995 |

OTHER PUBLICATIONS

Engler. B.H., et al., "Reduction of Exhaust Gas Emissions by Using Hydrocarbon Adsorber Systems", SAE 930738, 1993.

Kollmann, K., et al., "Concepts for Ultra Low Emission Vehicles", SAE 940469, 1994.

Wiilliam J.I., et al., "By-Pass Hydrocarbon Adsorber System for ULEV", SAE 960343. Feb. 1996.

Hertl, W., et al., "Hydrocarbon Adsorber System for Cold Start Emissions", SAE 960347, 1996.

Patil, M.D., et al., "In-Line Hydrocarbon Adsorber System for ULEV", SAE 960348, 1996.

Noda, N., et al., "In-line Hydrocarbon (HC) Adsorber System for Cold Start Application", SAE 970266, Feb. 1997.

Buhrmaster, C.L., et al., "Evaluation of In-Line Adsorber Technology", SAW 970267, 1997.

Ballinger, T.H., et al., "Hydrocarbon Trap Technology for the Reduction of Cold-Start Hydrocarbon Emissions", SAE 970741, 1997.

Silver, R.G., et al., "A Durable In-Line Hydrocarbon Adsorber for Reduced Cold Start Exhaust Emissions", SAE 972843, 1997.

Abthoff, J., et al., "Application of In-Line Hydrocarbon Adsorber Systems", SAE 980422, 1998.

Summers, J.C., et al., "Use of Light-Off Catalysts to Meet the California LEV/ULEV Standards", SAE 930386, 1993.

L.A. Times, "Nissan Sentra CA Rakes in the Green Awards", Nov. 22, 2000.

"Nissan Names 'Bluebird Sylphy': As New Sedan's Name, Volume Models to Feature the World's Cleanest Gasoline-fueled Car", Jul. 27, 2000.

\* cited by examiner

FIG 1

DEVICE FOR THE PURIFICATION OF EXHAUST GAS

CROSS-REFERENCE TO RELATED APPLICATIONS

The present application is a division of U.S. application Ser. No. 08/352,079, filed Dec. 1, 1994, now U.S. Pat. No. 7,442,346 B2, which is based upon and claims the benefit of priority from prior Japanese Patent Application No. 5-319931, filed on Dec. 20, 1993, the entire contents of all of which are incorporated herein by reference.

BACKGROUND OF THE INVENTION

1. Field of the Invention

This invention relates to a device for the purification of an exhaust gas discharged from an internal engine for automobiles and the like.

2. Description of the Related Art

As a catalyst for the purification of an exhaust gas discharged from an internal engine for an automobile or the like, there are widely used catalysts capable of simultaneously conducting oxidation of carbon monoxide (CO) and hydrocarbon (HC) and reduction of nitrogen oxide (NOx). As disclosed in JP-B-58-20307, a greater part of these catalysts are formed by adding a noble metal such as palladium (Pd), platinum (Pt) or rhodium (Rh) as a catalyst component, and if necessary, a rare earth metal such as cerium (Ce), lanthanum (La) or the like or an oxide of a base metal such as nickel (Ni) or the like as a co-catalyst component to an alumina coating layer formed on a refractory carrier.

Such a catalyst is strongly influenced by a temperature of the exhaust gas and an air-fuel ratio set in the engine. That is, the exhaust gas temperature for developing the purification performance by the catalyst for the automobile is generally required to be not lower than 300° C., while the catalyst most effectively acts at the air-fuel ratio near to a theoretical air-fuel ratio (A/F=14.6) balancing the oxidation of HC and CO and the reduction of NOx. In the automobile provided with a device for the purification of exhaust gas using the conventional three-way catalyst, therefore, this device is disposed at a position effectively developing the effect of the three-way catalyst and also a feedback control is carried out by detecting an oxygen concentration in the exhaust gas so as to hold the air-fuel mixture at approximately theoretical air-fuel ratio.

If the conventional three-way catalyst is arranged just after an exhaust manifold, the catalyst activity is low immediately after the start of the engine in which the exhaust gas temperature is low (not higher than 300° C.), so that there is caused a problem that a great amount of HC discharged just after the engine start (cold start) are discharged as they are without purification.

As the exhaust gas purifying device for solving the above problem, an HC trapper enclosing an adsorbent for adsorbing cold HC is arranged on an upstream side of a catalyst convertor for the exhaust gas as proposed in JP-A-2-135126 and JP-A-3-141816.

In the exhaust gas purifying device disclosed in JP-A-2-135126, however, there are problems that (1) since the catalyst component is impregnated at the downstream side of the adsorbent, HC drops off from the adsorbent before the catalyst reaches to its active temperature; and (2) since a solution of a catalyst metal is impregnated in zeolite, the durability of the catalyst component is poor. On the other hand, the exhaust gas purifying device disclosed in JP-A-3-141816 has a problem that (3) the control of dropping off the adsorbed HC is carried out by using a temperature sensor, a by-pass pipe, a control device and the like, so that the layout of exhaust system becomes complicated and the reliability is poor and impractical.

SUMMARY OF THE INVENTION

It is, therefore, an object of the invention to solve the aforementioned problems of the conventional techniques and to provide a device for the purification of exhaust gas which efficiently adsorbs HC of a high concentration discharged at the start of the engine and effectively purify the dropped-off HC at a temperature starting the dropping of HC from the adsorbing layer.

The inventors have noticed the problems of the above conventional techniques and proposed a method of producing an adsorption catalyst, in which a catalyst layer is provided on a zeolite layer effective for the HC adsorption, in JP-A-7-124468 and JP-A-7-124703. In the catalysts obtained by these methods, the catalyst layer as a surface layer is heated before the inner zeolite layer, so that the catalyst layer is activated at a stage of dropping off HC from the zeolite layer to well purify HC. In this connection, the inventors have further made various studies and confirmed that when an automobile provided at a rear surface of its floor with such an absorption catalyst is slowly accelerated or run at a low speed immediately after the start of the engine, a part of adsorbed HC drops off from the inner zeolite layer before the activation of the surface catalyst layer and hence the purification performance of HC discharged at the engine start somewhat lowers.

In order to solve this problem, the invention provides a device for the purification of exhaust gas in which a catalyst A obtained by coating a honeycomb carrier with a three-way catalyst purifying HC, CO and NOx in the vicinity of theoretical air-fuel ratio is disposed at an upstream side of the exhaust gas and an adsorption catalyst B obtained by coating a honeycomb carrier with zeolite effective for the adsorption of hydrocarbon is disposed at a downstream side of the exhaust gas.

As the adsorption catalyst B, it is preferable that a catalyst layer formed by mixing powder composed mainly of activated ceria and/or alumina with at least one noble metal selected from the group consisting of platinum (Pt), palladium (Pd) and rhodium (Rh) as a catalyst component is provided onto zeolite layer.

The carrier used in the invention has a monolith type honeycomb shape and includes any carriers such as cordierite, metal and the like.

BRIEF DESCRIPTION OF THE DRAWING

The invention will be described with reference to the accompanying drawing, wherein.

DESCRIPTION OF THE PREFERRED EMBODIMENTS

In general, zeolite absorbs HC at a low temperature and drops off HC with the rise of the temperature. Although the catalyst is rapidly activated at a certain temperature, HC is dropped off from zeolite with a certain distribution during the rise of the temperature. In accordance with the rise of the exhaust gas temperature, the three-way catalyst arranged before the adsorption catalyst is also activated and hence the temperature at the outlet of this catalyst or the temperature at the inlet of the adsorption catalyst is raised through reaction heat. As a result, the surface catalyst layer in the adsorption catalyst is rapidly activated by the rise of the temperature, so that when the adsorbed HC is dropped off from the zeolite layer, HC is efficiently purified. Furthermore, the three-way catalyst is arranged before the adsorption catalyst, so that the temperature rise of the zeolite layer is controlled to improve the adsorption performance.

Zeolites developing sufficient HC adsorption performance over a range of from room temperature to a relatively high temperature even in the presence of water and having a high durability are properly selected from the conventionally known zeolites as the zeolite used in the adsorption catalyst B according to the invention. For example, mordenite, USY, β-zeolite, ZSM-5 and the like are used. In order to efficiently adsorb many kinds of HC in the exhaust gas, it is preferable to mix two or more kinds of zeolites having different pore structures.

These zeolites have sufficient adsorption performance even in H-type, but the adsorption performance and the ability of preventing the drop-off can further be improved by carrying Pd, Ag, Cu, Cr, Co, Nd or the like on the zeolite through usual process such as ion exchange process, impregnation process, immersion process or the like. The quantity carried is optional, but is preferably within a range of 0.1-15% by weight. When the quantity is less than 0.1% by weight, the adsorption performance and the ability of preventing the drop-off are less, while when it exceeds 15% by weight, the effect is unchangeable.

Further, the distance between the three-way catalyst A at the upstream side and the adsorption catalyst B at the downstream side is not critical. When the distance is too near, there is a possibility of causing the degradation of engine performance due to the rise of back pressure, while when it is too apart from each other, the temperature of the surface catalyst layer in the adsorption catalyst located at the downstream side is not raised and there is a possibility of degrading the purification performance of the dropped-off HC. Therefore, the distance between the three-way catalyst A and the adsorption catalyst B is preferably within a range of 10-50 mm.

The following examples are given in illustration of the invention and are not intended as limitations thereof. In these examples, part is by weight otherwise specified.

EXAMPLE 1

Into a porcelain pot are charged 100 parts of activated ceria powder carried with Pt (hereinafter abbreviated as $Pt/CeO_2$), 50 parts of alumina and 150 parts of 2% nitric acid, which are mixed and pulverized in an oscillation mill for 40 minutes or in a universal ball mill for 6.5 hours to prepare a slurry. After a monolith cordierite carrier is subjected to a water treatment through a suction coating process, the above slurry is applied to the whole of the carrier through wash coating process and then an extra slurry is removed by the suction coating process. Thereafter, the carrier is dried and calcined at 400° C. for 1 hour, whereby 100 g/L of $Pt/CeO_2$ layer is coated onto the carrier. The wash coating, drying and calcination are repeated to form $Pt/CeO_2$ layer in a total quantity of 200 g/L.

Into a porcelain pot are charged 100 parts of alumina powder carried with Rh (hereinafter abbreviated as $Rh/Al_2O_3$), 50 parts of alumina and 150 parts of 2% nitric acid, which are treated in the same manner as described above to prepare a slurry. The resulting slurry is applied onto the $Pt/CeO_2$ layer in the same manner as described above to form 50 g/L of $Rh/Al_2O_3$ catalyst layer, which is dried and fired in air at 650° C. for 3 hours to form a catalyst A1 for an upstream side of exhaust gas.

Separately, 100 parts of H-type ZSM-5 ($SiO_2/Al_2O_3=700$) (hereinafter abbreviated as ZSM-5), 215 parts of silica sol (solid content: 20%), 100 parts of 10% nitric acid and 15 parts of water are charged into a porcelain pot to form a ZSM-5 slurry in the same manner as described above, which is applied onto a monolith carrier in a quantity of 150 g/L in the same manner as described above, dried and fired at 400° C. for 1 hour.

Onto the resulting ZSM-5 layer is applied 100 g/L of $Pt/CeO_2$ layer in the same manner as described above, which is dried and fired at 400° C. for 1 hour. Further, 50 g/L of $Rh/Al_2O_3$ catalyst layer is applied onto the $Pt/CeO_2$ layer, dried and fired in air at 650° C. for 3 hours to form an adsorption catalyst B1 for a downstream side of exhaust gas.

A tandem type adsorption catalyst-1 is obtained by combining the three-way catalyst A1 at the upstream side and the adsorption catalyst B1 at the downstream side.

EXAMPLE 2

Into a porcelain pot are charged 100 parts of H-type ZSM-5 ($SiO_2/Al_2O_3=700$), 215 parts of silica sol (solid content: 20%), 100 parts of 10% nitric acid and 15 parts of water to prepare ZSM-5 slurry in the same manner as in Example 1, which is applied onto a monolith carrier in a quantity of 150 g/L in the same manner, dried and fired at 400° C. for 1 hour.

Then, 100 parts of alumina powder carried with Pd (hereinafter abbreviated as $Pd/Al_2O_3$), 50 parts of alumina and 150 parts of 2% nitric acid are charged into a porcelain pot to prepare a slurry in the same manner as in Example 1, which is applied onto the ZSM-5 layer as 100 g/L of $Pd/Al_2O_3$ layer, dried and fired.

Furthermore, 50 g/L of $Rh/Al_2O_3$ catalyst layer is applied onto the $Pd/Al_2O_3$ layer in the same manner as in Example 1, dried and fired to obtain an adsorption catalyst B2.

A tandem type adsorption catalyst-2 is obtained by combining the three-way catalyst A1 at the upstream side and the adsorption catalyst B2 at the downstream side.

EXAMPLE 3

Into a porcelain pot are charged 50 parts of H-type ZSM-5 ($SiO_2/Al_2O_3=700$), 50 parts of H-type USY ($SiO_2/Al_2O_3=50$) (hereinafter abbreviated as USY), 215 parts of silica sol (solid content: 20%), 100 parts of 10% nitric acid and 15 parts of water to prepare a mixed slurry of ZSM-5 and USY in the same manner as in Example 1. The mixed slurry is applied onto a monolith carrier in a quantity of 150 g/L in the same manner as in Example 1, dried and fired.

Then, 100 g/L of $Pt/CeO_2$ layer is applied onto the mixed layer of ZSM-5 and USY in the same manner as in Example 1, dried and fired. Furthermore, 50 g/L of $Rh/Al_2O_3$ catalyst layer is applied onto the $Pt/CeO_2$ layer in the same manner as in Example 1, dried and fired to obtain an adsorption catalyst B3.

A tandem type adsorption catalyst-3 is obtained by combining the three-way catalyst A1 at the upstream side and the adsorption catalyst B3 at the downstream side.

EXAMPLE 4

Into a porcelain pot are charged 50 parts of H-type ZSM-5 ($SiO_2/Al_2O_3=700$), 50 parts of H-type USY ($SiO_2/Al_2O_3=50$), 215 parts of silica sol (solid content: 20%), 100 parts of 10% nitric acid and 15 parts of water to prepare a mixed slurry of ZSM-5 and USY in the same manner as in Example 1. The mixed slurry is applied onto a monolith carrier in a quantity of 150 g/L in the same manner as in Example 1, dried and fired.

Then, 100 g/L of Pd/$Al_2O_3$ catalyst layer is applied onto the mixed layer of ZSM-5 and USY in the same manner as in Example 2, dried and fired. Furthermore, 50 g/L of Rh/$Al_2O_3$ catalyst layer is applied onto the Pd/$Al_2O_3$ layer in the same manner as in Example 1, dried and fired to obtain an adsorption catalyst B4.

A tandem type adsorption catalyst-4 is obtained by combining the three-way catalyst A1 at the upstream side and the adsorption catalyst B4 at the downstream side.

EXAMPLE 5

Into a porcelain pot are charged 67 parts of H-type ZSM-5 ($SiO_2$/$Al_2O_3$=700), 33 parts of H-type USY ($SiO_2$/$Al_2O_3$=50), 215 parts of silica sol (solid content: 20%), 100 parts of 10% nitric acid and 15 parts of water to prepare a mixed slurry of ZSM-5 and USY in the same manner as in Example 1. The mixed slurry is applied onto a monolith carrier in a quantity of 150 g/L in the same manner as in Example 1, dried and fired.

Then, 100 g/L of Pt/$CeO_2$ layer is applied onto the mixed layer of ZSM-5 and USY in the same manner as in Example 1, dried and fired. Furthermore, 50 g/L of Rh/$Al_2O_3$ catalyst layer is applied onto the Pt/$CeO_2$ layer in the same manner as in Example 1, dried and fired to obtain an adsorption catalyst B5.

A tandem type adsorption catalyst-5 is obtained by combining the three-way catalyst A1 at the upstream side and the adsorption catalyst B5 at the downstream side.

EXAMPLE 6

Into a porcelain pot are charged 67 parts of H-type ZSM-5 ($SiO_2$/$Al_2O_3$=700), 33 parts of H-type USY ($SiO_2$/$Al_2O_3$=50), 215 parts of silica sol (solid content: 20%), 100 parts of 10% nitric acid and 15 parts of water to prepare a mixed slurry of ZSM-5 and USY in the same manner as in Example 1. The mixed slurry is applied onto a monolith carrier in a quantity of 150 g/L in the same manner as in Example 1, dried and fired.

Then, 100 g/L of Pd/$Al_2O_3$ catalyst layer is applied onto the mixed layer of ZSM-5 and USY in the same manner as in Example 2, dried and fired. Furthermore, 50 g/L of Rh/$Al_2O_3$ catalyst layer is applied onto the Pd/$Al_2O_3$ layer in the same manner as in Example 1, dried and fired to obtain an adsorption catalyst B6.

A tandem type adsorption catalyst-6 is obtained by combining the three-way catalyst A1 at the upstream side and the adsorption catalyst B6 at the downstream side.

EXAMPLE 7

Into a porcelain pot are charged 50 parts of H-type ZSM-5 ($SiO_2$/$Al_2O_3$=700), 50 parts of H-type mordenite (hereinafter abbreviated as mordenite) ($SiO_2$/$Al_2O_3$=200), 215 parts of silica sol (solid content: 20%), 100 parts of 10% nitric acid and 15 parts of water to prepare a mixed slurry of ZSM-5 and mordenite in the same manner as in Example 1. The mixed slurry is applied onto a monolith carrier in a quantity of 150 g/L in the same manner as in Example 1, dried and fired.

Then, 100 g/L of Pt/$CeO_2$ layer is applied onto the mixed layer of ZSM-5 and mordenite in the same manner as in Example 1, dried and fired. Furthermore, 50 g/L of Rh/$Al_2O_3$ catalyst layer is applied onto the Pt/$CeO_2$ layer in the same manner as in Example 1, dried and fired to obtain an adsorption catalyst B7.

A tandem type adsorption catalyst-7 is obtained by combining the three-way catalyst A1 at the upstream side and the adsorption catalyst B7 at the downstream side.

EXAMPLE 8

Into a porcelain pot are charged 50 parts of H-type ZSM-5 ($SiO_2$/$Al_2O_3$=700), 50 parts of H-type mordenite ($SiO_2$/$Al_2O_3$=200), 215 parts of silica sol (solid content: 20%), 100 parts of 10% nitric acid and 15 parts of water to prepare a mixed slurry of ZSM-5 and mordenite in the same manner as in Example 1. The mixed slurry is applied onto a monolith carrier in a quantity of 150 g/L in the same manner as in Example 1, dried and fired.

Then, 100 g/L of Pd/$Al_2O_3$ catalyst layer is applied onto the mixed layer of ZSM-5 and mordenite in the same manner as in Example 1, dried and fired. Furthermore, 50 g/L of Rh/$Al_2O_3$ catalyst layer is applied onto the Pd/$Al_2O_3$ layer in the same manner as in Example 1, dried and fired to obtain an adsorption catalyst B8.

A tandem type adsorption catalyst-8 is obtained by combining the three-way catalyst A1 at the upstream side and the adsorption catalyst B8 at the downstream side.

EXAMPLE 9

Into a porcelain pot are charged 50 parts of H-type ZSM-5 ($SiO_2$/$Al_2O_3$=700), 50 parts of H-type β-zeolite (hereinafter abbreviated as β-zeolite) ($SiO_2$/$Al_2O_3$=100), 215 parts of silica sol (solid content: 20%), 100 parts of 10% nitric acid and 15 parts of water to prepare a mixed slurry of ZSM-5 and β-zeolite in the same manner as in Example 1. The mixed slurry is applied onto a monolith carrier in a quantity of 150 g/L in the same manner as in Example 1, dried and fired.

Then, 100 g/L of Pt/$CeO_2$ layer is applied onto the mixed layer of ZSM-5 and β-zeolite in the same manner as in Example 1, dried and fired. Furthermore, 50 g/L of Rh/$Al_2O_3$ catalyst layer is applied onto the Pt/$CeO_2$ layer in the same manner as in Example 1, dried and fired to obtain an adsorption catalyst B9.

A tandem type adsorption catalyst-9 is obtained by combining the three-way catalyst A1 at the upstream side and the adsorption catalyst B9 at the downstream side.

EXAMPLE 10

Into a porcelain pot are charged 50 parts of H-type ZSM-5 ($SiO_2$/$Al_2O_3$=700), 50 parts of H-type β-zeolite ($SiO_2$/$Al_2O_3$=100), 215 parts of silica sol (solid content: 20%), 100 parts of 10% nitric acid and 15 parts of water to prepare a mixed slurry of ZSM-5 and β-zeolite in the same manner as in Example 1. The mixed slurry is applied onto a monolith carrier in a quantity of 150 g/L in the same manner as in Example 1, dried and fired.

Then, 100 g/L of Pd/$Al_2O_3$ catalyst layer is applied onto the mixed layer of ZSM-5 and β-zeolite in the same manner as in Example 2, dried and fired. Furthermore, 50 g/L of Rh/$Al_2O_3$ catalyst layer is applied onto the Pd/$Al_2O_3$ layer in the same manner as in Example 1, dried and fired to obtain an adsorption catalyst B10.

A tandem type adsorption catalyst-10 is obtained by combining the three-way catalyst A1 at the upstream side and the adsorption catalyst B10 at the downstream side.

EXAMPLE 11

Into a porcelain pot are charged 67 parts of H-type ZSM-5 ($SiO_2/Al_2O_3$=700), 33 parts of H-type β-zeolite ($SiO_2/Al_2O_3$=100), 215 parts of silica sol (solid content: 20%), 100 parts of 10% nitric acid and 15 parts of water to prepare a mixed slurry of ZSM-5 and β-zeolite in the same manner as in Example 1. The mixed slurry is applied onto a monolith carrier in a quantity of 150 g/L in the same manner as in Example 1, dried and fired.

Then, 100 g/L of $Pt/CeO_2$ catalyst layer is applied onto the mixed layer of ZSM-5 and β-zeolite in the same manner as in Example 1, dried and fired. Furthermore, 50 g/L of $Rh/Al_2O_3$ catalyst layer is applied onto the $Pt/CeO_2$ layer in the same manner as in Example 1, dried and fired to obtain an adsorption catalyst B11.

A tandem type adsorption catalyst-11 is obtained by combining the three-way catalyst A1 at the upstream side and the adsorption catalyst B11 at the downstream side.

EXAMPLE 12

Into a porcelain pot are charged 67 parts of H-type ZSM-5 ($SiO_2/Al_2O_3$=700), 33 parts of H-type β-zeolite ($SiO_2/Al_2O_3$=100), 215 parts of silica sol (solid content: 20%), 100 parts of 10% nitric acid and 15 parts of water to prepare a mixed slurry of ZSM-5 and β-zeolite in the same manner as in Example 1. The mixed slurry is applied onto a monolith carrier in a quantity of 150 g/L in the same manner as in Example 1, dried and fired.

Then, 100 g/L of $Pd/Al_2O_3$ catalyst layer is applied onto the mixed layer of ZSM-5 and β-zeolite in the same manner as in Example 2, dried and fired. Furthermore, 50 g/L of $Rh/Al_2O_3$ catalyst layer is applied onto the $Pd/Al_2O_3$ layer in the same manner as in Example 1, dried and fired to obtain an adsorption catalyst B12.

A tandem type adsorption catalyst-12 is obtained by combining the three-way catalyst A1 at the upstream side and the adsorption catalyst B12 at the downstream side.

EXAMPLE 13

Into a porcelain pot are charged 100 parts of H-type USY ($SiO_2/Al_2O_3$=50), 215 parts of silica sol (solid content: 20%), 100 parts of 10% nitric acid and 15 parts of water to prepare a USY slurry in the same manner as in Example 1. The slurry is applied onto a monolith carrier in a quantity of 150 g/L in the same manner as in Example 1, dried and fired.

Then, 100 g/L of $Pt/CeO_2$ catalyst layer is applied onto the USY layer in the same manner as in Example 1, dried and fired. Furthermore, 50 g/L of $Rh/Al_2O_3$ catalyst layer is applied onto the $Pt/CeO_2$ layer in the same manner as in Example 1, dried and fired to obtain an adsorption catalyst B13.

A tandem type adsorption catalyst-13 is obtained by combining the three-way catalyst A1 at the upstream side and the adsorption catalyst B13 at the downstream side.

EXAMPLE 14

Into a porcelain pot are charged 100 parts of H-type USY ($SiO_2/Al_2O_3$=50), 215 parts of silica sol (solid content: 20%), 100 parts of 10% nitric acid and 15 parts of water to prepare a USY slurry in the same manner as in Example 1. The slurry is applied onto a monolith carrier in a quantity of 150 g/L in the same manner as in Example 1, dried and fired.

Then, 100 g/L of $Pd/Al_2O_3$ catalyst layer is applied onto the USY layer in the same manner as in Example 2, dried and fired. Furthermore, 50 g/L of $Rh/Al_2O_3$ catalyst layer is applied onto the $Pd/Al_2O_3$ layer in the same manner as in Example 1, dried and fired to obtain an adsorption catalyst B14.

A tandem type adsorption catalyst-14 is obtained by combining the three-way catalyst A1 at the upstream side and the adsorption catalyst B14 at the downstream side.

EXAMPLE 15

Into a porcelain pot are charged 100 parts of H-type β-zeolite ($SiO_2/Al_2O_3$=100), 215 parts of silica sol (solid content: 20%), 100 parts of 10% nitric acid and 15 parts of water to prepare a β-zeolite slurry in the same manner as in Example 1. The slurry is applied onto a monolith carrier in a quantity of 150 g/L in the same manner as in Example 1, dried and fired.

Then, 100 g/L of $Pt/CeO_2$ catalyst layer is applied onto the β-zeolite layer in the same manner as in Example 1, dried and fired. Furthermore, 50 g/L of $Rh/Al_2O_3$ catalyst layer is applied onto the $Pt/CeO_2$ layer in the same manner as in Example 1, dried and fired to obtain an adsorption catalyst B15.

A tandem type adsorption catalyst-15 is obtained by combining the three-way catalyst A1 at the upstream side and the adsorption catalyst B15 at the downstream side.

EXAMPLE 16

Into a porcelain pot are charged 100 parts of H-type β-zeolite ($SiO_2/Al_2O_3$=100), 215 parts of silica sol (solid content: 20%), 100 parts of 10% nitric acid and 15 parts of water to prepare a β-zeolite slurry in the same manner as in Example 1. The slurry is applied onto a monolith carrier in a quantity of 150 g/L in the same manner as in Example 1, dried and fired.

Then, 100 g/L of $Pd/Al_2O_3$ catalyst layer is applied onto the β-zeolite layer in the same manner as in Example 2, dried and fired. Furthermore, 50 g/L of $Rh/Al_2O_3$ catalyst layer is applied onto the $Pd/Al_2O_3$ layer in the same manner as in Example 1, dried and fired to obtain an adsorption catalyst B16.

A tandem type adsorption catalyst-16 is obtained by combining the three-way catalyst A1 at the upstream side and the adsorption catalyst B16 at the downstream side.

EXAMPLE 17

Into a porcelain pot are charged 100 parts of H-type mordenite ($SiO_2/Al_2O_3$=200), 215 parts of silica sol (solid content: 20%), 100 parts of 10% nitric acid and 15 parts of water to prepare a mordenite slurry in the same manner as in Example 1. The slurry is applied onto a monolith carrier in a quantity of 150 g/L in the same manner as in Example 1, dried and fired.

Then, 100 g/L of $Pt/CeO_2$ catalyst layer is applied onto the mordenite layer in the same manner as in Example 1, dried and fired. Furthermore, 50 g/L of $Rh/Al_2O_3$ catalyst layer is applied onto the $Pt/CeO_2$ layer in the same manner as in Example 1, dried and fired to obtain an adsorption catalyst B17.

A tandem type adsorption catalyst-17 is obtained by combining the three-way catalyst A1 at the upstream side and the adsorption catalyst B17 at the downstream side.

EXAMPLE 18

Into a porcelain pot are charged 100 parts of H-type mordenite ($SiO_2/Al_2O_3$=200), 215 parts of silica sol (solid content: 20%), 100 parts of 10% nitric acid and 15 parts of water to prepare a mordenite slurry in the same manner as in Example 1. The slurry is applied onto a monolith carrier in a quantity of 150 g/L in the same manner as in Example 1, dried and fired.

Then, 100 g/L of Pd/Al$_2$O$_3$ catalyst layer is applied onto the mordenite layer in the same manner as in Example 2, dried and fired. Furthermore, 50 g/L of Rh/Al$_2$O$_3$ catalyst layer is applied onto the Pd/Al$_2$O$_3$ layer in the same manner as in Example 1, dried and fired to obtain an adsorption catalyst B18.

A tandem type adsorption catalyst-18 is obtained by combining the three-way catalyst A1 at the upstream side and the adsorption catalyst B18 at the downstream side.

EXAMPLE 19

Into a porcelain pot are charged 34 parts of H-type ZSM-5 (SiO$_2$/Al$_2$O$_3$=700), 33 parts of H-type USY (SiO$_2$/Al$_{23}$O$_3$=50), 33 parts of H-type mordenite (SiO$_2$/Al$_2$O$_3$=200), 215 parts of silica sol (solid content: 20%), 100 parts of 10% nitric acid and 15 parts of water to prepare a mixed slurry of ZSM-5, USY and mordenite in the same manner as in Example 1. The mixed slurry is applied onto a monolith carrier in a quantity of 150 g/L in the same manner as in Example 1, dried and fired.

Then, 100 g/L of Pt/CeO$_2$ catalyst layer is applied onto the mixed layer of ZSM-5, USY and mordenite in the same manner as in Example 1, dried and fired. Furthermore, 50 g/L of Rh/Al$_2$O$_3$ catalyst layer is applied onto the Pt/CeO$_2$ layer in the same manner as in Example 1, dried and fired to obtain an adsorption catalyst B19.

A tandem type adsorption catalyst-19 is obtained by combining the three-way catalyst A1 at the upstream side and the adsorption catalyst B19 at the downstream side.

EXAMPLE 20

Into a porcelain pot are charged 34 parts of H-type ZSM-5 (SiO$_2$/Al$_2$O$_3$=700), 33 parts of H-type USY (SiO$_2$/Al$_2$O$_3$=50), 33 parts of H-type mordenite (SiO$_2$/Al$_2$O$_3$=200), 215 parts of silica sol (solid content: 20%), 100 parts of 10% nitric acid and 15 parts of water to prepare a mixed slurry of ZSM-5, USY and mordenite in the same manner as in Example 1. The mixed slurry is applied onto a monolith carrier in a quantity of 150 g/L in the same manner as in Example 1, dried and fired.

Then, 100 g/L of Pd/Al$_2$O$_3$ catalyst layer is applied onto the mixed layer of ZSM-5, USY and mordenite in the same manner as in Example 2, dried and fired. Furthermore, 50 g/L of Rh/Al$_2$O$_3$ catalyst layer is applied onto the Pd/Al$_2$O$_3$ layer in the same manner as in Example 1, dried and fired to obtain an adsorption catalyst B20.

A tandem type adsorption catalyst-20 is obtained by combining the three-way catalyst A1 at the upstream side and the adsorption catalyst B20 at the downstream side.

EXAMPLE 21

Into a porcelain pot are charged 34 parts of H-type ZSM-5 (SiO$_2$/Al$_2$O$_3$=700), 33 parts of H-type USY (SiO$_2$/Al$_2$O$_3$=50), 33 parts of H-type β-zeolite (SiO$_2$/Al$_2$O$_3$=100), 215 parts of silica sol (solid content: 20%), 100 parts of 10% nitric acid and 15 parts of water to prepare a mixed slurry of ZSM-5, USY and β-zeolite in the same manner as in Example 1. The mixed slurry is applied onto a monolith carrier in a quantity of 150 g/L in the same manner as in Example 1, dried and fired.

Then, 100 g/L of Pt/CeO$_2$ catalyst layer is applied onto the mixed layer of ZSM-5, USY and β-zeolite in the same manner as in Example 1, dried and fired. Furthermore, 50 g/L of Rh/Al$_2$O$_3$ catalyst layer is applied onto the Pt/CeO$_2$ layer in the same manner as in Example 1, dried and fired to obtain an adsorption catalyst B21.

A tandem type adsorption catalyst-21 is obtained by combining the three-way catalyst A1 at the upstream side and the adsorption catalyst B21 at the downstream side.

EXAMPLE 22

Into a porcelain pot are charged 34 parts of H-type ZSM-5 (SiO$_2$/Al$_2$O$_3$=700), 33 parts of H-type USY (SiO$_2$/Al$_2$O$_3$=50), 33 parts of H-type β-zeolite (SiO$_2$/Al$_2$O$_3$=100), 215 parts of silica sol (solid content: 20%), 100 parts of 10% nitric acid and 15 parts of water to prepare a mixed slurry of ZSM-5, USY and β-zeolite in the same manner as in Example 1. The mixed slurry is applied onto a monolith carrier in a quantity of 150 g/L in the same manner as in Example 1, dried and fired.

Then, 100 g/L of Pd/Al$_2$O$_3$ catalyst layer is applied onto the mixed layer of ZSM-5, USY and β-zeolite in the same manner as in Example 2, dried and fired. Furthermore, 50 g/L of Rh/Al$_2$O$_3$ catalyst layer is applied onto the Pd/Al$_2$O$_3$ layer in the same manner as in Example 1, dried and fired to obtain an adsorption catalyst B22.

A tandem type adsorption catalyst-22 is obtained by combining the three-way catalyst A1 at the upstream side and the adsorption catalyst B22 at the downstream side.

EXAMPLE 23

Into a porcelain pot are charged 34 parts of H-type ZSM-5 (SiO$_2$/Al$_2$O$_3$=700), 33 parts of Ag-ion exchanged ZSM-5 (hereinafter abbreviated as Ag-ZSM-5) (quantity of Ag carried: 5% by weight, SiO$_2$/Al$_2$O$_3$=30), 33 parts of H-type USY (SiO$_2$/Al$_2$O$_3$=50), 215 parts of silica sol (solid content: 20%), 100 parts of 10% nitric acid and 15 parts of water to prepare a mixed slurry of ZSM-5, Ag-ZSM-5 and USY in the same manner as in Example 1. The mixed slurry is applied onto a monolith carrier in a quantity of 150 g/L in the same manner as in Example 1, dried and fired.

Then, 100 g/L of Pt/CeO$_2$ catalyst layer is applied onto the mixed layer of ZSM-5, Ag-ZSM-5 and USY in the same manner as in Example 1, dried and fired. Furthermore, 50 g/L of Rh/Al$_2$O$_3$ catalyst layer is applied onto the Pt/CeO$_2$ layer in the same manner as in Example 1, dried and fired to obtain an adsorption catalyst B23.

A tandem type adsorption catalyst-23 is obtained by combining the three-way catalyst A1 at the upstream side and the adsorption catalyst B23 at the downstream side.

EXAMPLE 24

Into a porcelain pot are charged 34 parts of H-type ZSM-5 (SiO$_2$/Al$_2$O$_3$=700), 33 parts of Ag-ion exchanged ZSM-5 (quantity of Ag carried: 5% by weight, SiO$_2$/Al$_2$O$_3$=30), 33 parts of H-type USY (SiO$_2$/Al$_2$O$_3$=50), 215 parts of silica sol (solid content: 20%), 100 parts of 10% nitric acid and 15 parts of water to prepare a mixed slurry of ZSM-5, Ag-ZSM-5 and USY in the same manner as in Example 1. The mixed slurry is applied onto a monolith carrier in a quantity of 150 g/L in the same manner as in Example 1, dried and fired.

Then, 100 g/L of Pd/Al$_2$O$_3$ catalyst layer is applied onto the mixed layer of ZSM-5, Ag-ZSM-5 and USY in the same manner as in Example 2, dried and fired. Furthermore, 50 g/L of Rh/Al$_2$O$_3$ catalyst layer is applied onto the Pd/Al$_2$O$_3$ layer in the same manner as in Example 1, dried and fired to obtain an adsorption catalyst B24.

A tandem type adsorption catalyst-24 is obtained by combining the three-way catalyst A1 at the upstream side and the adsorption catalyst B24 at the downstream side.

EXAMPLE 25

Into a porcelain pot are charged 34 parts of H-type ZSM-5 (SiO$_2$/Al$_2$O$_3$=700), 33 parts of Pd-ion exchanged ZSM-5 (hereinafter abbreviated as Pd-ZSM-5) (quantity of Pd carried: 2% by weight, SiO$_2$/Al$_2$O$_3$=30), 33 parts of H-type USY (SiO$_2$/Al$_2$O$_3$=50), 215 parts of silica sol (solid content: 20%), 100 parts of 10% nitric acid and 15 parts of water to prepare a mixed slurry of ZSM-5, Pd-ZSM-5 and USY in the same manner as in Example 1. The mixed slurry is applied onto a monolith carrier in a quantity of 150 g/L in the same manner as in Example 1, dried and fired.

Then, 100 g/L of Pt/CeO$_2$ catalyst layer is applied onto the mixed layer of ZSM-5, Pd-ZSM-5 and USY in the same manner as in Example 1, dried and fired. Furthermore, 50 g/L of Rh/Al$_2$O$_3$ catalyst layer is applied onto the Pt/CeO$_2$ layer in the same manner as in Example 1, dried and fired to obtain an adsorption catalyst B25.

A tandem type adsorption catalyst-25 is obtained by combining the three-way catalyst A1 at the upstream side and the adsorption catalyst B25 at the downstream side.

EXAMPLE 26

Into a porcelain pot are charged 34 parts of H-type ZSM-5 (SiO$_2$/Al$_2$O$_3$=700), 33 parts of Pd-ion exchanged ZSM-5 (quantity of Pd carried: 2% by weight, SiO$_2$/Al$_{23}$=30), 33 parts of H-type USY (SiO$_2$/Al$_2$O$_3$=50), 215 parts of silica sol (solid content: 20%), 100 parts of 10% nitric acid and 15 parts of water to prepare a mixed slurry of ZSM-5, Pd-ZSM-5 and USY in the same manner as in Example 1. The mixed slurry is applied onto a monolith carrier in a quantity of 150 g/L in the same manner as in Example 1, dried and fired.

Then, 100 g/L of Pd/Al$_2$O$_3$ catalyst layer is applied onto the mixed layer of ZSM-5, Pd-ZSM-5 and USY in the same manner as in Example 2, dried and fired. Furthermore, 50 g/L of Rh/Al$_2$O$_3$ catalyst layer is applied onto the Pd/Al$_2$O$_3$ layer in the same manner as in Example 1, dried and fired to obtain an adsorption catalyst B26.

A tandem type adsorption catalyst-26 is obtained by combining the three-way catalyst A1 at the upstream side and the adsorption catalyst B26 at the downstream side.

EXAMPLE 27

Into a porcelain pot are charged 34 parts of H-type ZSM-5 (SiO$_2$/Al$_2$O$_3$=700), 33 parts of Ag-ion exchanged ZSM-5 (quantity of Ag carried: 5% by weight, SiO$_2$/Al$_2$O$_3$=30), 33 parts of H-type β-zeolite (SiO$_2$/Al$_2$O$_3$=100), 215 parts of silica sol (solid content: 20%), 100 parts of 10% nitric acid and 15 parts of water to prepare a mixed slurry of ZSM-5, Ag-ZSM-5 and β-zeolite in the same manner as in Example 1. The mixed slurry is applied onto a monolith carrier in a quantity of 150 g/L in the same manner as in Example 1, dried and fired.

Then, 100 g/L of Pt/CeO$_2$ catalyst layer is applied onto the mixed layer of ZSM-5, Ag-ZSM-5 and β-zeolite in the same manner as in Example 1, dried and fired. Furthermore, 50 g/L of Rh/Al$_2$O$_3$ catalyst layer is applied onto the Pt/CeO$_2$ layer in the same manner as in Example 1, dried and fired to obtain an adsorption catalyst B27.

A tandem type adsorption catalyst-27 is obtained by combining the three-way catalyst A1 at the upstream side and the adsorption catalyst B27 at the downstream side.

EXAMPLE 28

Into a porcelain pot are charged 34 parts of H-type ZSM-5 (SiO$_2$/Al$_2$O$_3$=700), 33 parts of Ag-ion exchanged ZSM-5 (quantity of Ag carried: 5% by weight, SiO$_2$/Al$_2$O$_3$=30), 33 parts of H-type β-zeolite (SiO$_2$/Al$_2$O$_3$=100), 215 parts of silica sol (solid content: 20%), 100 parts of 10% nitric acid and 15 parts of water to prepare a mixed slurry of ZSM-5, Ag-ZSM-5 and β-zeolite in the same manner as in Example 1. The mixed slurry is applied onto a monolith carrier in a quantity of 150 g/L in the same manner as in Example 1, dried and fired.

Then, 100 g/L of Pd/Al$_2$O$_3$ catalyst layer is applied onto the mixed layer of ZSM-5, Ag-ZSM-5 and β-zeolite in the same manner as in Example 2, dried and fired. Furthermore, 50 g/L of Rh/Al$_2$O$_3$ catalyst layer is applied onto the Pd/Al$_2$O$_3$ layer in the same manner as in Example 1, dried and fired to obtain an adsorption catalyst B28.

A tandem type adsorption catalyst-28 is obtained by combining the three-way catalyst A1 at the upstream side and the adsorption catalyst B28 at the downstream side.

EXAMPLE 29

Into a porcelain pot are charged 34 parts of H-type ZSM-5 (SiO$_2$/Al$_2$O$_3$=700), 33 parts of Pd-ion exchanged ZSM-5 (quantity of Pd carried: 2% by weight, SiO$_2$/Al$_2$O$_3$=30), 33 parts of H-type β-zeolite (SiO$_2$/Al$_2$O$_3$=100), 215 parts of silica sol (solid content: 20%), 100 parts of 10% nitric acid and 15 parts of water to prepare a mixed slurry of ZSM-5, Pd-ZSM-5 and β-zeolite in the same manner as in Example 1. The mixed slurry is applied onto a monolith carrier in a quantity of 150 g/L in the same manner as in Example 1, dried and fired.

Then, 100 g/L of Pt/CeO$_2$ catalyst layer is applied onto the mixed layer of ZSM-5, Pd-ZSM-5 and β-zeolite in the same manner as in Example 1, dried and fired. Furthermore, 50 g/L of Rh/Al$_2$O$_3$ catalyst layer is applied onto the Pt/CeO$_2$ layer in the same manner as in Example 1, dried and fired to obtain an adsorption catalyst B29.

A tandem type adsorption catalyst-29 is obtained by combining the three-way catalyst A1 at the upstream side and the adsorption catalyst B29 at the downstream side.

EXAMPLE 30

Into a porcelain pot are charged 34 parts of H-type ZSM-5 (SiO$_2$/Al$_2$O$_3$=700), 33 parts of Pd-ion exchanged ZSM-5 (quantity of Pd carried: 2% by weight, SiO$_2$/Al$_2$O$_3$=30), 33 parts of H-type β-zeolite (SiO$_2$/Al$_2$O$_3$=100), 215 parts of silica sol (solid content: 20%), 100 parts of 10% nitric acid and 15 parts of water to prepare a mixed slurry of ZSM-5, Pd-ZSM-5 and β-zeolite in the same manner as in Example 1. The mixed slurry is applied onto a monolith carrier in a quantity of 150 g/L in the same manner as in Example 1, dried and fired.

Then, 100 g/L of Pd/Al$_2$O$_3$ catalyst layer is applied onto the mixed layer of ZSM-5, Pd-ZSM-5 and β-zeolite in the same manner as in Example 2, dried and fired. Furthermore, 50 g/L of Rh/Al$_2$O$_3$ catalyst layer is applied onto the Pd/Al$_2$O$_3$ layer in the same manner as in Example 1, dried and fired to obtain an adsorption catalyst B30.

A tandem type adsorption catalyst-30 is obtained by combining the three-way catalyst A1 at the upstream side and the adsorption catalyst B30 at the downstream side.

EXAMPLE 31

Into a porcelain pot are charged 50 parts of H-type ZSM-5 (SiO$_2$/Al$_2$O$_3$=700), 50 parts of Ag-ion exchanged USY (hereinafter abbreviated as Ag-USY) (quantity of Ag carried: 5% by weight, SiO$_2$/Al$_2$O$_3$=12), 215 parts of silica sol (solid content: 20%), 100 parts of 10% nitric acid and 15 parts of water to prepare a mixed slurry of ZSM-5 and Ag-USY in the same manner as in Example 1. The mixed slurry is applied onto a monolith carrier in a quantity of 150 g/L in the same manner as in Example 1, dried and fired.

Then, 100 g/L of Pt/CeO$_2$ catalyst layer is applied onto the mixed layer of ZSM-5 and Ag-USY in the same manner as in Example 1, dried and fired. Furthermore, 50 g/L of Rh/Al$_2$O$_3$ catalyst layer is applied onto the Pt/CeO$_2$ layer in the same manner as in Example 1, dried and fired to obtain an adsorption catalyst B31.

A tandem type adsorption catalyst-31 is obtained by combining the three-way catalyst A1 at the upstream side and the adsorption catalyst B31 at the downstream side.

EXAMPLE 32

Into a porcelain pot are charged 50 parts of H-type ZSM-5 (SiO$_2$/Al$_2$O$_3$=700), 50 parts of Ag-USY (quantity of Ag carried: 5% by weight, SiO$_2$/Al$_2$O$_3$=12), 215 parts of silica sol (solid content: 20%), 100 parts of 10% nitric acid and 15 parts of water to prepare a mixed slurry of ZSM-5 and Ag-USY in the same manner as in Example 1. The mixed slurry is applied onto a monolith carrier in a quantity of 150 g/L in the same manner as in Example 1, dried and fired.

Then, 100 g/L of Pd/Al$_2$O$_3$ catalyst layer is applied onto the mixed layer of ZSM-5 and Ag-USY in the same manner as in Example 2, dried and fired. Furthermore, 50 g/L of Rh/Al$_2$O$_3$ catalyst layer is applied onto the Pd/Al$_2$O$_3$ layer in the same manner as in Example 1, dried and fired to obtain an adsorption catalyst B32.

A tandem type adsorption catalyst-32 is obtained by combining the three-way catalyst A1 at the upstream side and the adsorption catalyst B32 at the downstream side.

EXAMPLE 33

A three-way catalyst A2 is produced in the same manner as in Example 1 except that 200 g/L of Pd/CeO$_2$ layer is applied, dried and fired and then 50 g/L of Rh/Al$_2$O$_3$ layer is coated on the Pd/CeO$_2$ layer, dried and fired in air at 650° C. for 3 hours.

A tandem type adsorption catalyst-33 is obtained by combining the three-way catalyst A2 at the upstream side and the adsorption catalyst B5 at the downstream side.

EXAMPLE 34

A tandem type adsorption catalyst-34 is obtained by combining the three-way catalyst A2 at the upstream side and the adsorption catalyst B9 at the downstream side.

Comparative Example 1

Into a porcelain pot are charged 100 parts of H-type USY (SiO$_2$/Al$_2$O$_3$=50), 215 parts of silica sol (solid content: 20%), 100 parts of 10% nitric acid and 15 parts of water to prepare a slurry in the same manner as in Example 1, which is applied onto a monolith carrier in a quantity of 150 g/L, dried and fired in the same manner as in Example 1 to obtain an adsorption catalyst B35.

A tandem type adsorption catalyst-35 is obtained by combining the adsorption catalyst B35 at the upstream side and the three-way catalyst A1 at the downstream side.

Comparative Example 2

Into a porcelain pot are charged 100 parts of H-type USY (SiO$_2$/Al$_2$O$_3$=7), 215 parts of silica sol (solid content: 20%), 100 parts of 10% nitric acid and 15 parts of water to prepare a slurry in the same manner as in Example 1, which is applied onto a monolith carrier in a quantity of 150 g/L, dried and fired in the same manner as in Example 1 to obtain an adsorption catalyst B36.

A tandem type adsorption catalyst-36 is obtained by combining the adsorption catalyst B36 at the upstream side and the three-way catalyst A1 at the downstream side.

Comparative Example 3

A tandem type adsorption catalyst-37 is obtained by combining the adsorption catalyst B13 at the upstream side and the three-way catalyst A1 at the downstream side.

In Table 1 are shown compositions of three-way catalyst and adsorption catalyst in Examples 1-34 and Comparative Examples 1-3, respectively.

TABLE 1

| | | | Catalyst at upstream side of exhaust gas | | Catalyst at downstream side of exhaust gas | |
|---|---|---|---|---|---|---|
| | | | Composition | Quantity carried | Composition | Quantity carried |
| Example | 1 | inner layer | Pt/CeO$_2$ | 200 g/L | inner layer ZSM5 | 150 g/L |
| | | middle layer | Rh/Al$_2$O$_3$ | 50 g/L | middle layer Pt/CeO$_2$ | 100 g/L |
| | | surface layer | | | surface layer Rh/Al$_2$O$_3$ | 50 g/L |
| | 2 | inner layer | Pt/CeO$_2$ | 200 g/L | inner layer ZSM5 | 150 g/L |
| | | middle layer | Rh/Al$_2$O$_3$ | 50 g/L | middle layer Pd/Al$_2$O$_3$ | 100 g/L |
| | | surface layer | | | surface layer Rh/Al$_2$O$_3$ | 50 g/L |
| | 3 | inner layer | Pt/CeO$_2$ | 200 g/L | inner layer ZSM5:USY(1:1) | 150 g/L |
| | | middle layer | Rh/Al$_2$O$_3$ | 50 g/L | middle layer Pt/CeO$_2$ | 100 g/L |
| | | surface layer | | | surface layer Rh/Al$_2$O$_3$ | 50 g/L |
| | 4 | inner layer | Pt/CeO$_2$ | 200 g/L | inner layer ZSM5:USY(1:1) | 150 g/L |
| | | middle layer | Rh/Al$_2$O$_3$ | 50 g/L | middle layer Pd/Al$_2$O$_3$ | 100 g/L |
| | | surface layer | | | surface layer Rh/Al$_2$O$_3$ | 50 g/L |

TABLE 1-continued

| | | Catalyst at upstream side of exhaust gas | | Catalyst at downstream side of exhaust gas | |
|---|---|---|---|---|---|
| | | Composition | Quantity carried | Composition | Quantity carried |
| 5 | inner layer | Pt/CeO$_2$ | 200 g/L | ZSM5:USY(2:1) | 150 g/L |
| | middle layer | Rh/Al$_2$O$_3$ | 50 g/L | Pt/CeO$_2$ | 100 g/L |
| | surface layer | | | Rh/Al$_2$O$_3$ | 50 g/L |
| 6 | inner layer | Pt/CeO$_2$ | 200 g/L | ZSM5:USY(2:1) | 150 g/L |
| | middle layer | Rh/Al$_2$O$_3$ | 50 g/L | Pd/Al$_2$O$_3$ | 100 g/L |
| | surface layer | | | Rh/Al$_2$O$_3$ | 50 g/L |
| 7 | inner layer | Pt/CeO$_2$ | 200 g/L | ZSM5:mordenite(1:1) | 150 g/L |
| | middle layer | Rh/Al$_2$O$_3$ | 50 g/L | Pt/CeO$_2$ | 100 g/L |
| | surface layer | | | Rh/Al$_2$O$_3$ | 50 g/L |
| 8 | inner layer | Pt/CeO$_2$ | 200 g/L | ZSM5:mordenite(1:1) | 150 g/L |
| | middle layer | Rh/Al$_2$O$_3$ | 50 g/L | Pd/Al$_2$O$_3$ | 100 g/L |
| | surface layer | | | Rh/Al$_2$O$_3$ | 50 g/L |
| 9 | inner layer | Pt/CeO$_2$ | 200 g/L | ZSM5:β-zeolite(1:1) | 150 g/L |
| | middle layer | Rh/Al$_2$O$_3$ | 50 g/L | Pt/CeO$_2$ | 100 g/L |
| | surface layer | | | Rh/Al$_2$O$_3$ | 50 g/L |
| 10 | inner layer | Pt/CeO$_2$ | 200 g/L | ZSM5:β-zeolite(1:1) | 150 g/L |
| | middle layer | Rh/Al$_2$O$_3$ | 50 g/L | Pd/Al$_2$O$_3$ | 100 g/L |
| | surface layer | | | Rh/Al$_2$O$_3$ | 50 g/L |
| 11 | inner layer | Pt/CeO$_2$ | 200 g/L | ZSM5:β-zeolite(2:1) | 150 g/L |
| | middle layer | Rh/Al$_2$O$_3$ | 50 g/L | Pt/CeO$_2$ | 100 g/L |
| | surface layer | | | Rh/Al$_2$O$_3$ | 50 g/L |
| 12 | inner layer | Pt/CeO$_2$ | 200 g/L | ZSM5:β-zeolite(2:1) | 150 g/L |
| | middle layer | Rh/Al$_2$O$_3$ | 50 g/L | Pd/Al$_2$O$_3$ | 100 g/L |
| | surface layer | | | Rh/Al$_2$O$_3$ | 50 g/L |
| 13 | inner layer | Pt/CeO$_2$ | 200 g/L | USY | 150 g/L |
| | middle layer | Rh/Al$_2$O$_3$ | 50 g/L | Pt/CeO$_2$ | 100 g/L |
| | surface layer | | | Rh/Al$_2$O$_3$ | 50 g/L |
| 14 | inner layer | Pt/CeO$_2$ | 200 g/L | USY | 150 g/L |
| | middle layer | Rh/Al$_2$O$_3$ | 50 g/L | Pd/Al$_2$O$_3$ | 100 g/L |
| | surface layer | | | Rh/Al$_2$O$_3$ | 50 g/L |
| 15 | inner layer | Pt/CeO$_2$ | 200 g/L | β-zeolite | 150 g/L |
| | middle layer | Rh/Al$_2$O$_3$ | 50 g/L | Pt/CeO$_2$ | 100 g/L |
| | surface layer | | | Rh/Al$_2$O$_3$ | 50 g/L |
| 16 | inner layer | Pt/CeO$_2$ | 200 g/L | β-zeolite | 150 g/L |
| | middle layer | Rh/Al$_2$O$_3$ | 50 g/L | Pd/Al$_2$O$_3$ | 100 g/L |
| | surface layer | | | Rh/Al$_2$O$_3$ | 50 g/L |
| 17 | inner layer | Pt/CeO$_2$ | 200 g/L | mordenite | 150 g/L |
| | middle layer | Rh/Al$_2$O$_3$ | 50 g/L | Pt/CeO$_2$ | 100 g/L |
| | surface layer | | | Rh/Al$_2$O$_3$ | 50 g/L |
| 18 | inner layer | Pt/CeO$_2$ | 200 g/L | mordenite | 150 g/L |
| | middle layer | Rh/Al$_2$O$_3$ | 50 g/L | Pd/Al$_2$O$_3$ | 100 g/L |
| | surface layer | | | Rh/Al$_2$O$_3$ | 50 g/L |
| 19 | inner layer | Pt/CeO$_2$ | 200 g/L | ZSM5:USY:mordenite(1:1:1) | 150 g/L |
| | middle layer | Rh/Al$_2$O$_3$ | 50 g/L | Pt/CeO$_2$ | 100 g/L |
| | surface layer | | | Rh/Al$_2$O$_3$ | 50 g/L |
| 20 | inner layer | Pt/CeO$_2$ | 200 g/L | ZSM5:USY:mordenite(1:1:1) | 150 g/L |
| | middle layer | Rh/Al$_2$O$_3$ | 50 g/L | Pd/Al$_2$O$_3$ | 100 g/L |
| | surface layer | | | Rh/Al$_2$O$_3$ | 50 g/L |
| 21 | inner layer | Pt/CeO$_2$ | 200 g/L | ZSM5:USY:β-zeolite(1:1:1) | 150 g/L |
| | middle layer | Rh/Al$_2$O$_3$ | 50 g/L | Pt/CeO$_2$ | 100 g/L |
| | surface layer | | | Rh/Al$_2$O$_3$ | 50 g/L |
| 22 | inner layer | Pt/CeO$_2$ | 200 g/L | ZSM5:USY:β-zeolite(1:1:1) | 150 g/L |
| | middle layer | Rh/Al$_2$O$_3$ | 50 g/L | Pd/Al$_2$O$_3$ | 100 g/L |
| | surface layer | | | Rh/Al$_2$O$_3$ | 50 g/L |
| 23 | inner layer | Pt/CeO$_2$ | 200 g/L | ZSM5:AgZSM5:USY(1:1:1) | 150 g/L |
| | middle layer | Rh/Al$_2$O$_3$ | 50 g/L | Pt/CeO$_2$ | 100 g/L |
| | surface layer | | | Rh/Al$_2$O$_3$ | 50 g/L |
| 24 | inner layer | Pt/CeO$_2$ | 200 g/L | ZSM5:AgZSM5:USY(1:1:1) | 150 g/L |
| | middle layer | Rh/Al$_2$O$_3$ | 50 g/L | Pd/Al$_2$O$_3$ | 100 g/L |
| | surface layer | | | Rh/Al$_2$O$_3$ | 50 g/L |
| 25 | inner layer | Pt/CeO$_2$ | 200 g/L | ZSM5:PdZSM5:USY(1:1:1) | 150 g/L |
| | middle layer | Rh/Al$_2$O$_3$ | 50 g/L | Pt/CeO$_2$ | 100 g/L |
| | surface layer | | | Rh/Al$_2$O$_3$ | 50 g/L |
| 26 | inner layer | Pt/CeO$_2$ | 200 g/L | ZSM5:PdZSM5:USY(1:1:1) | 150 g/L |
| | middle layer | Rh/Al$_2$O$_3$ | 50 g/L | Pd/Al$_2$O$_3$ | 100 g/L |
| | surface layer | | | Rh/Al$_2$O$_3$ | 50 g/L |
| 27 | inner layer | Pt/CeO$_2$ | 200 g/L | ZSM5:AgZSM5:USY(1:1:1) | 150 g/L |
| | middle layer | Rh/Al$_2$O$_3$ | 50 g/L | Pt/CeO$_2$ | 100 g/L |
| | surface layer | | | Rh/Al$_2$O$_3$ | 50 g/L |
| 28 | inner layer | Pt/CeO$_2$ | 200 g/L | ZSM5:AgZSM5:β-zeolite(1:1:1) | 150 g/L |
| | middle layer | Rh/Al$_2$O$_3$ | 50 g/L | Pd/Al$_2$O$_3$ | 100 g/L |
| | surface layer | | | Rh/Al$_2$O$_3$ | 50 g/L |

TABLE 1-continued

| | | Catalyst at upstream side of exhaust gas | | | Catalyst at downstream side of exhaust gas | |
|---|---|---|---|---|---|---|
| | | Composition | Quantity carried | | Composition | Quantity carried |
| | 29 inner layer<br>middle layer<br>surface layer | Pt/CeO$_2$<br>Rh/Al$_2$O$_3$ | 200 g/L<br>50 g/L | inner layer<br>middle layer<br>surface layer | ZSM5:PdZSM5:β-zeolite(1:1:1)<br>Pt/CeO$_2$<br>Rh/Al$_2$O$_3$ | 150 g/L<br>100 g/L<br>50 g/L |
| | 30 inner layer<br>middle layer<br>surface layer | Pt/CeO$_2$<br>Rh/Al$_2$O$_3$ | 200 g/L<br>50 g/L | inner layer<br>middle layer<br>surface layer | ZSM5:PdZSM5:β-zeolite(1:1:1)<br>Pd/Al$_2$O$_3$<br>Rh/Al$_2$O$_3$ | 150 g/L<br>100 g/L<br>50 g/L |
| | 31 inner layer<br>middle layer<br>surface layer | Pt/CeO$_2$<br>Rh/Al$_2$O$_3$ | 200 g/L<br>50 g/L | inner layer<br>middle layer<br>surface layer | ZSM5:AgUSY(1:1)<br>Pt/CeO$_2$<br>Rh/Al$_2$O$_3$ | 150 g/L<br>100 g/L<br>50 g/L |
| | 32 inner layer<br>middle layer<br>surface layer | Pt/CeO$_2$<br>Rh/Al$_2$O$_3$ | 200 g/L<br>50 g/L | inner layer<br>middle layer<br>surface layer | ZSM5:AgUSY(1:1)<br>Pd/Al$_2$O$_3$<br>Rh/Al$_2$O$_3$ | 150 g/L<br>100 g/L<br>50 g/L |
| | 33 inner layer<br>middle layer<br>surface layer | Pd/CeO$_2$<br>Rh/Al$_2$O$_3$ | 200 g/L<br>50 g/L | inner layer<br>middle layer<br>surface layer | ZSM5:USY(2:1)<br>Pt/CeO$_2$<br>Rh/Al$_2$O$_3$ | 150 g/L<br>100 g/L<br>50 g/L |
| | 34 inner layer<br>middle layer<br>surface layer | Pd/CeO$_2$<br>Rh/Al$_2$O$_3$ | 200 g/L<br>50 g/L | inner layer<br>middle layer<br>surface layer | ZSM5:β-zeolite(1:1)<br>Pt/CeO$_2$<br>Rh/Al$_2$O$_3$ | 150 g/L<br>100 g/L<br>50 g/L |
| Comparative Example | 1 inner layer<br>middle layer<br>surface layer | USY(Si/2Al = 50) | 150 g/L | inner layer<br>middle layer<br>surface layer | Pt/CeO$_2$<br>Rh/Al$_2$O$_3$ | 200 g/L<br>50 g/L |
| | 2 inner layer<br>middle layer<br>surface layer | USY(Si/2Al = 7) | 150 g/L | inner layer<br>middle layer<br>surface layer | Pt/CeO$_2$<br>Rh/Al$_2$O$_3$ | 200 g/L<br>50 g/L |
| | 3 inner layer<br>middle layer<br>surface layer | USY<br>Pt/CeO$_2$<br>Rh/Al$_2$O$_3$ | 150 g/L<br>100 g/L<br>50 g/L | inner layer<br>middle layer<br>surface layer | Pt/CeO$_2$<br>Rh/Al$_2$O$_3$ | 200 g/L<br>50 g/L |

Test Example

The evaluation of HC adsorption-purification performance (FTP75Abag) is conducted by using an automobile (displacement: 3000 cc, made by Nissan Motor Co., Ltd.) provided with a tandem type adsorption catalyst consisting of a three-way catalyst A and an adsorption catalyst B produced in each of Examples 1-34 and Comparative Examples 1-3 under the following evaluation conditions. The purification performance of each adsorption catalyst B is carried out in comparison with a system having no adsorption catalyst (provided with only the three-way catalyst A).

That is, the evaluation is as follows:

(1) An emission cut ratio is measured over a time of Abag 0-125 seconds for evaluating an adsorption performance of HC discharged at the start of the engine.

(2) An emission cut ratio is measured over a time of Abag 0-505 seconds for evaluating an adsorption purification performance of HC at the start of the engine and after the rise of temperature.

(i) Composition of exhaust gas

| at engine start (0-125 seconds) | aromatics | 44.4% |
|---|---|---|
| | paraffin | 33.3% |
| | olefin | 22.3% |
| at idling of engine (125-505 seconds) | | |
| | aromatics | 43.7% |
| | paraffin | 20.1% |
| | olefin | 36.2% |

(ii) Temperature at an Inlet of Three-Way Catalyst A located at an upstream side of exhaust gas

| 0 second | 25° C. |
|---|---|
| 100 seconds | 190° C. |
| 200 seconds | 340° C. |
| 300 seconds | 470° C. |
| 400 seconds | 420° C. |
| 500 seconds | 400° C. |

Figure 1:
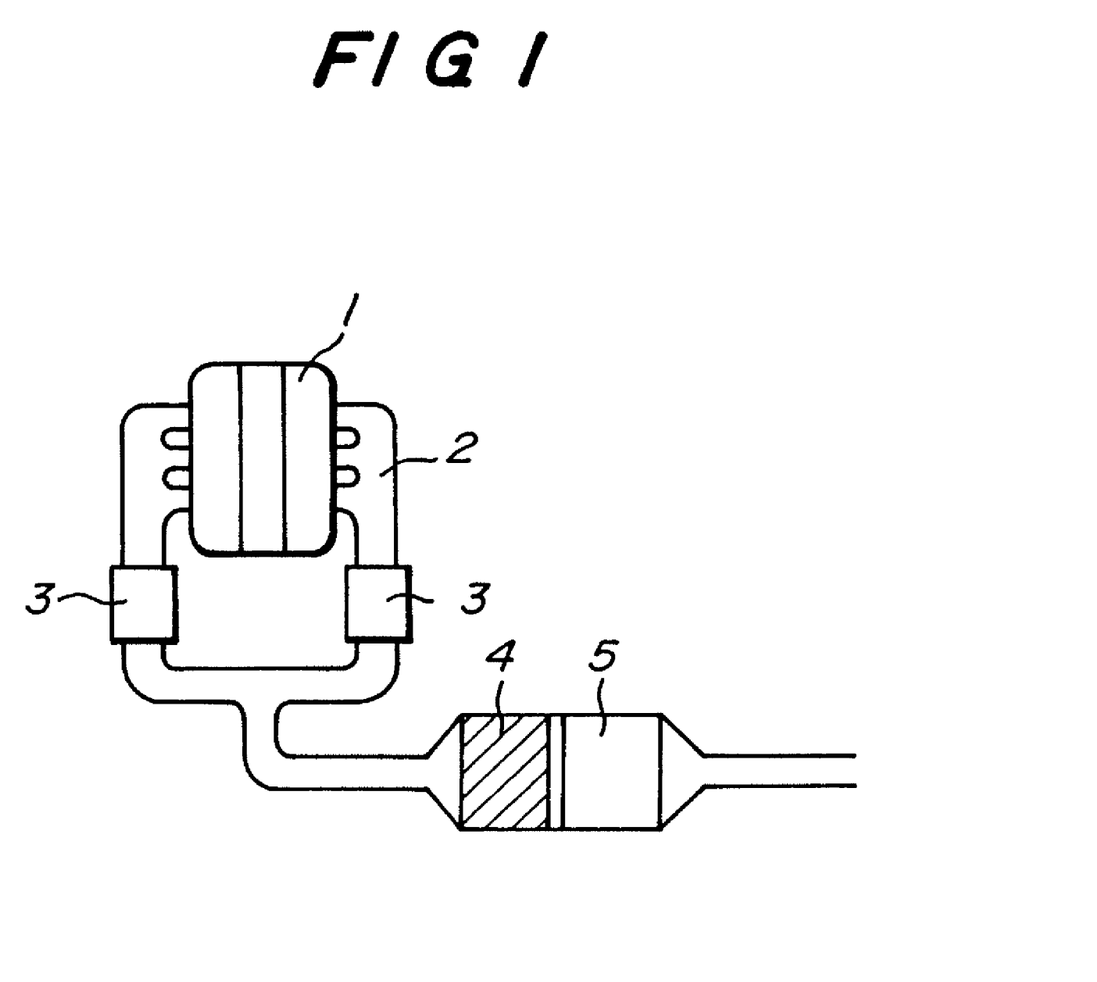
FIG. 1 is a diagrammatic view of a device for the purification of exhaust gas used in Test Example.

In the evaluation, an aged product 3 of three-way Pt—Rh catalyst obtained by aging a precatalyst (0.5 L) carried with 40 g/cf of Pt/Rh at Pt:Rh=5:1 at 850° C. for 100 hours (presence of combustion cut) is disposed on an exhaust manifold 2 of an engine 1 and a device 4, 5 for the purification of exhaust gas consisting of a three-way catalyst A (1.3 L) and an adsorption catalyst B (1.3 L) is disposed beneath a floor of the automobile as shown in FIG. 1. The evaluation results are shown in Table 2.

TABLE 2

| | | HC cut percentage (Abag) | | |
|---|---|---|---|---|
| | Catalyst No. | 0~125 seconds | 0~505 seconds | Remarks |
| Tandem type adsorption catalyst | 1 | 47.8 | 10.1 | Example 1 |
| | 2 | 47.8 | 10.4 | Example 2 |
| | 3 | 60.3 | 19.2 | Example 3 |
| | 4 | 60.2 | 21.5 | Example 4 |
| | 5 | 60.7 | 19.5 | Example 5 |
| | 6 | 60.7 | 21.7 | Example 6 |
| | 7 | 50.8 | 17.0 | Example 7 |
| | 8 | 50.8 | 17.3 | Example 8 |
| | 9 | 60.9 | 21.7 | Example 9 |
| | 10 | 61.4 | 21.8 | Example 10 |

TABLE 2-continued

HC cut percentage (Abag)

| Catalyst No. | 0~125 seconds | 0~505 seconds | Remarks |
|---|---|---|---|
| 11 | 61.4 | 21.9 | Example 11 |
| 12 | 48.4 | 22.1 | Example 12 |
| 13 | 38.5 | 16.9 | Example 13 |
| 14 | 38.5 | 17.0 | Example 14 |
| 15 | 54.0 | 19.0 | Example 15 |
| 16 | 54.0 | 19.2 | Example 16 |
| 17 | 48.1 | 13.3 | Example 17 |
| 18 | 48.1 | 13.3 | Example 18 |
| 19 | 61.1 | 19.0 | Example 19 |
| 20 | 61.1 | 19.1 | Example 20 |
| 21 | 61.6 | 22.1 | Example 21 |
| 22 | 61.6 | 22.2 | Example 22 |
| 23 | 61.9 | 22.5 | Example 23 |
| 24 | 61.9 | 22.7 | Example 24 |
| 25 | 60.4 | 19.4 | Example 25 |
| 26 | 60.5 | 21.8 | Example 26 |
| 27 | 62.1 | 22.9 | Example 27 |
| 28 | 62.2 | 22.9 | Example 28 |
| 29 | 60.6 | 19.3 | Example 29 |
| 30 | 60.6 | 19.3 | Example 30 |
| 31 | 61.1 | 19.9 | Example 31 |
| 32 | 61.1 | 19.9 | Example 32 |
| 33 | 60.8 | 20.8 | Example 33 |
| 34 | 60.9 | 21.9 | Example 34 |
| 35 | 39.4 | 0 | Comparative Example 1 |
| 36 | 2.0 | 0 | Comparative Example 2 |
| 37 | 39.4 | 13.1 | Comparative Example 3 |

As mentioned above, in the exhaust gas purification device according to the invention, the three-way catalyst obtained by coating a carrier with an inorganic material containing an active catalyst component is disposed at an upstream side of the exhaust gas and the adsorption catalyst obtained by coating a zeolite adsorption layer on a carrier effective for HC adsorption with a catalyst layer is disposed at a downstream side of the exhaust gas, whereby the dropped ff HC is well purified even at a temperature of beginning the dropping-off of HC from the adsorption layer.

What is claimed is:

1. A method for the catalytic purification of exhaust gases from an internal combustion engine, which comprises:
   (a) conducting exhaust gases from an internal combustion engine first into contact with a catalyst A comprising a honeycomb carrier and a three-way catalyst formed thereon;
   (b) next causing all of the exhaust gases contacted with catalyst A to flow out of the catalyst A;
   (c) next causing all of the exhaust gases flowing out of the catalyst A to flow directly into an adsorption catalyst B only a single time in a single pass system, at all time during operation of the catalyst A and the catalyst B during the method, wherein the catalyst B comprises: a honeycomb carrier; an adsorption layer formed thereon for the effective adsorption of hydrocarbons; and a catalyst layer consisting essentially of a noble metal selected from the group consisting of platinum, palladium and rhodium and at least one of ceria and alumina, wherein the catalyst layer is a separate layer applied to the adsorption layer and coats the adsorption layer, and wherein the adsorption catalyst B is located downstream of the catalyst A in the direction of the exhaust gas directly; and
   (d) during the method, heating the catalyst B by a heat source for supplying heat to the adsorption catalyst B from outside of the adsorption catalyst B, the heat source consisting essentially of engine combustion heat carried by the exhaust gases and heat generated by reactions occurring at the catalyst A.

2. A method for the catalytic purification of exhaust gases from an internal combustion engine according to claim 1, which further consists essentially of, before step (a), contacting the exhaust gas with a three-way precatalyst located upstream of the catalyst A in the direction of exhaust gas flow.

3. A method for the catalytic purification of exhaust gases from an internal combustion engine according to claim 1, wherein the noble metal is carried on the adsorption layer in an amount of 0.1-15% by weight.

4. A method for the catalytic purification of exhaust gases from an internal combustion engine according to claim 1, wherein the adsorption layer includes a zeolite.

5. A method for the catalytic purification of exhaust gases from an internal combustion engine according to claim 1, wherein the adsorption layer comprises a zeolite and contains silica.

6. A method for the catalytic purification of exhaust gases from an internal combustion engine according to claim 1, wherein the zeolite comprises (β-zeolite and the adsorption layer contains 33 to 100% by weight of β-zeolite.

7. A method for the catalytic purification of exhaust gases from an internal combustion engine according to claim 1, wherein the catalyst A and the adsorption catalyst B are arranged in one housing together.

8. A method for the catalytic purification of exhaust gases from an internal combustion engine according to claim 1, wherein the catalyst A and the adsorption catalyst B are 10-50 mm apart.

9. A method for the catalytic purification of exhaust gases from an internal combustion engine according to claim 1, wherein the catalyst layer comprises ceria and alumina with the noble metal carried thereon.

10. A method for the catalytic purification of exhaust gases from an internal combustion engine employing a catalyst system for the purification of exhaust gases from an internal combustion engine, which comprises:
   (i) a catalyst A serving for the primary purification of the exhaust gases comprising a honeycomb carrier and a three-way catalyst formed thereon;
   (ii) an adsorption catalyst B comprising: a honeycomb carrier; an adsorption layer formed thereon for the effective adsorption of hydrocarbons; and a catalyst layer consisting essentially of a noble metal selected from the group consisting of platinum, palladium and rhodium, and at least one of ceria and alumina, wherein the catalyst layer is applied as a separate layer to the adsorption layer, and wherein the adsorption catalyst B is located downstream of the catalyst A in the direction of the exhaust gas directly;
   (iii) means, including a direct unbranched passageway between the catalyst A and the adsorption catalyst B, for conducting all the exhaust gases flowing out of the catalyst A to flow into the adsorption catalyst B at all time during operation of the catalyst system; and
   (iv) means for supplying heat to the adsorption catalyst B from a heat source outside of the adsorption catalyst B, consisting essentially of engine combustion heat carried;
   the method comprising:
   (a) conducting exhaust gases from an internal combustion engine first into contact with said catalyst A;

(b) next causing all of the exhaust gases contacted with catalyst A to flow out of the catalyst A;

(c) next causing all of the exhaust gases flowing out of the catalyst A to flow directly into said adsorption catalyst B only a single time in a single pass system, at all time during operation of the catalyst A and the adsorption catalyst B during the method, wherein the adsorption catalyst B is located downstream of the catalyst A in the direction of the exhaust gas directly; and (d) during the method, heating the adsorption catalyst B by a heat source for supplying heat to the adsorption catalyst B from outside of the adsorption catalyst B, the heat source consisting essentially of engine combustion heat carried by the exhaust gases and heat generated by reactions occurring at the catalyst A.

11. A method for catalytic purification of exhaust gases from an internal combustion engine for an automobile vehicle, which comprises:

(a) contacting exhaust gases from an internal combustion engine with a three-way precatalyst disposed on an exhaust manifold of an engine;

(b) next causing all of the exhaust gases contacted with the precatalyst to directly flow into a catalyst A disposed beneath a floor of the vehicle, the catalyst A comprising a honeycomb carrier and a three-way catalyst formed thereon;

(c) next causing all of the exhaust gases contacted with the catalyst A to flow out of the catalyst A;

(d) next causing all of the exhaust gases flowing out of the catalyst A to flow directly into an adsorption catalyst B only a single time in a single pass system, at all time during operation of the catalyst A and the adsorption catalyst B during the method, wherein the hydrocarbons are effectively adsorbed; and a catalyst layer consisting essentially of a noble metal selected from the group consisting of platinum, palladium and rhodium and at least one of ceria and alumina, wherein the catalyst layer is a separate layer coating the adsorption layer, wherein the adsorption catalyst B is located downstream of the catalyst A in the direction of the exhaust gas directly, and wherein the adsorption catalyst B is disposed beneath the floor of the vehicle; and (e) during the method, heating the adsorption catalyst B by a heat source for supplying heat to the adsorption catalyst B from outside of the adsorption catalyst B, the heat source consisting essentially of engine combustion heat carried by the exhaust gases and heat generated by reactions occurring both at the precatalyst and catalyst A.

* * * * *